United States Patent Office 3,367,954
Patented Feb. 6, 1968

3,367,954
PROCESS FOR PREPARING DIORGANOANTIMONY COMPOUNDS R₂SbOOCR' AND NOVEL PRODUCTS SO PREPARED
John R. Leebrick, Old Lyme, Conn., and Nathaniel L. Remes, Livingston, N.J., assignors to M & T Chemicals Inc., New York, N.Y., a corporation of Delaware
No Drawing. Continuation-in-part of application Ser. No. 241,023, Nov. 29, 1962. This application Apr. 24, 1964, Ser. No. 362,484
25 Claims. (Cl. 260—414)

ABSTRACT OF THE DISCLOSURE

In accordance with certain of its aspects, the process of this invention for preparing a diorganoantimony compound of the formula $R_2SbOOCR'$ wherein R is selected from the group consisting of alkyl, aryl, and alkenyl, and R' is hydrocarbon, comprises mixing together as reactants $R_2SbX$ wherein X is halogen having an atomic weight greater than 19; and $M(OOCR')_a$ wherein M is a cation selected from the group consisting of ammonium, alkali metals and alkaline earth metals, and $a$ is the valence of M; in the presence of an inert solvent for at least one of said reactants, thereby forming product $R_2SbOOCR'$; and recovering said product.

---

This application is a continuation-in-part of Ser. No. 241,023 filed Nov. 29, 1962 and now abandoned.

This invention relates to a novel process for preparing organoantimony compounds and to novel organoantimony compounds prepared thereby.

Organoantimony compounds of the formula $$R_2SbOOCR'$$

wherein R is a hydrocarbon group and OOCR' is an anionic carboxylate group are useful as stabilizers, bactericides, germicides, etc. Especially desirable compounds are those wherein R' is selected from the group consisting of alkyl containing at least 3 carbon atoms, aryl and alkenyl. These novel compounds have not heretofore been described and there has not been reported in the prior art any process for their preparation.

It is an object of this invention to provide a novel process characterized by its ability to produce high yields of high purity diorganoantimony carboxylate compounds. It is a further object to provide novel organoantimony compounds. Other objects will become apparent to those skilled in the art upon reading the following disclosure.

In accordance with certain of its aspects, the process of this invention for preparing a diorganoantimony compound of the formula $R_2SbOOCR'$ wherein R is selected from the group consisting of alkyl, aryl, and alkenyl, and R' is hydrocarbon, comprises mixing together as reactants $R_2SbX$ wherein X is halogen having an atomic weight greater than 19; and $M(OOCR')_a$ wherein M is a cation selected from the group consisting of ammonium, alkali metals and alkaline earth metals, and $a$ is the valence of M; in the presence of an inert solvent for at least one of said reactants, thereby forming product $R_2SbOOCR'$; and recovering said product.

Typically, both R and R' may be selected from the group consisting of alkyl, aryl, and alkenyl.

In accordance with this invention, $R_2SbOOCR'$ may be prepared by reacting together $R_2SbX$ and $M(OOCR')_a$; wherein R and R' are selected from the group consisting of alkyl, aryl, and alkenyl. Typical alkyls may include methyl, ethyl, n-propyl, isopropyl, n-butyl, isobutyl, sec-butyl, tert-butyl, amyl, hexyl, octyl, decyl, dodecyl, octadecyl, cyclohexyl, cycloheptyl, etc. Typical aryls may include phenyl, naphthyl, phenanthryl, etc. Typical alkenyls may include vinyl, allyl, 1-propenyl, 1-butenyl, 2-butenyl, 3-butenyl, etc. The radicals R and R' may be inertly substituted alkyl, aryl, or alkenyl radicals, i.e., may bear a substituent which does not react with other components of the process or interfere with the reaction. Typical inert substituents may include halogen, nitro, ether, aryl, alkyl, etc. Typical inertly substituted R and R' radicals may include chlorophenyl, nitrophenyl, benzyl, tolyl, ethylphenyl, phenylethyl, chlorobutyl, 2-ethylhexyl, ethoxyethyl, methylcyclohexyl, 4-chloro-3-butenyl, etc. R and R' may be the same or different. Preferably, R may be aryl and most preferably it may be phenyl. Preferably R' may be selected from the group consisting of alkyl containing at least three carbon atoms, aryl, and alkenyl.

In the reactant $R_2SbX$, X may be halogen having an atomic weight greater than 19, e.g., chlorine, bromine and iodine. Most preferably, X may be chlorine.

Typical $R_2SbX$ reactants which may be employed in the practice of this invention include diphenylantimony chloride, dibenzylantimony bromide, diallylantimony iodide, ditolylantimony chloride, dibenzylantimony chloride, dichlorophenylantimony bromide, dicyclohexylantimony chloride, dioctylantimony iodide, etc. Preferably R may be aryl, most preferably phenyl, and X may be chlorine, and the reactant $R_2SbX$ may be diphenylantimony chloride.

These compounds may be readily available, or they may readily be prepared. For example, three moles of Grignard reagent RMgCl, say phenylmagnesium chloride, may be reacted with one mole of $SbCl_3$ to give $R_3Sb$, say triphenylantimony. Two moles of $R_3Sb$ may then be reacted with one mole of $SbCl_3$ to give $R_2SbCl$, say diphenylantimony chloride.

$R_2SbX$ may be reacted with $M(OOCR')_a$ wherein R' is independently selected from the same group as R; M is a cation selected from the group consisting of ammonium, alkali metals and alkaline earth metals; and $a$ is the valence of M. M may be ammonium, sodium, potassium, lithium, calcium, magnesium, strontium, etc. Preferably M may be ammonium, sodium or potassium.

In the compound $M(OOCR')_a$, R' may be selected from the group consisting of alkyl, aryl and alkenyl and $a$ may be the valence of M. Typical illustrative $M(OOCR')_a$ reactants may include:

| | |
|---|---|
| ammonium acetate | magnesium laurate |
| sodium acetate | calcium stearate |
| potassium acetate | potassium oleate |
| calcium acetate | ammonium benzoate |
| magnesium acetate | magnesium p-toluate |
| ammonium propionate | sodium-ethylbenzoate |
| sodium butyrate | calcium α-naphthoate |
| potassium α-methylpropionate | ammonium phenylacetate |
| | sodium phenoxyacetate |
| calcium 2-ethylhexanoate | potassium linoleate |
| magnesium valerate | calcium cyclohexanoate |
| sodium caproate | magnesium tetrachlorobenzoate |
| ammonium α-methylvalerate | |
| potassium caprylate | sodium pelargonate |

Other suitable reactants are those derived from commercial carboxylic acid, e.g., sodium tallate, ammonium rosinate, etc. The compound $M(OOCR')_a$ may be employed in the form of anhydrous material, hydrate, e.g., sodium acetate trihydrate, etc. It may be added to the reaction mixture qua salt or it may be formed in the reaction mixture by separately adding the appropriate base, e.g., ammonium hydroxide, sodium carbonate, sodium hydroxide, etc., and the appropriate acid, e.g., acetic acid, benzoic acid, etc.

The reaction which occurs in the process of this invention may be represented as (I)  $aR_2SbX + M(OOCR')_a \rightarrow aR_2SbOOCR' + MX_a$ A specific, preferred embodiment of the process may be (II)  $\phi_2SbCl + NH_4OOCCH_3 \rightarrow \phi_2SbOOCCH_3 + NH_4Cl$ Preferably, $R_2SbX$ and $M(OOCR')_a$ may be reacted by mixing them together in the presence of an inert solvent for at least one of said reactants. An inert solvent is one which does not react with either of the reactants under the reaction conditions or otherwise interfere with the preparation. Preferably, the inert solvent may have a boiling point of about 60–150° C. at atmospheric pressure. The inert solvent may typically be employed in the amount of about 150–2,500 parts by weight per 100 parts by weight of total reactants, and preferably 300–1500, say 1000 parts by weight per 100 parts by weight of total reactants.

Where the reactant $M(OOCR')_a$ is water-soluble, e.g. when M is ammonium, sodium or potassium and R' is lower alkyl or aryl, the inert solvent may preferably be water. When water is employed, product $R_2SbOOCR'$ may be precipitated from solution as formed, and by-product $MX_a$ may be retained in solution. Thus, the use of water as the inert solvent may be desirable because of the ease with which the product may be recovered.

If desired, the inert solvent may be an inert organic solvent such as benzene, toluene, xylene, tetrahydrofuran, methanol, hexane, heptane, ligroin, petroleum ether, cyclohexane, etc. When inert organic solvents are employed, by-product $MX_a$ may typically be precipitated from solution and product $R_2SbOOCR'$ may be recovered by filtering off by-product, stripping the solvent from the filtrate, preferably under reduced pressure, and distilling or recrystallizing the residue.

The two reactants may preferably be mixed together in stoichiometric quantities according to Reaction (I) supra. If desired, excesses of either reactant may be employed, but more than about 10% excess may not give any substantial additional advantage. The reaction may conveniently be carried out at relatively low temperatures, typically 20–150° C. and may be substantially complete in about 0.5–20 hours.

During the reaction and isolation of the product, it may be desirable to maintain an inert atmosphere, typically nitrogen or refluxing inert solvent, to prevent undesirable oxidation reactions. In particular, the dialkylantimony and dialkenylantimony compounds may react readily with oxygen and may, therefore, require an inert atmosphere.

The product $R_2SbOOCR'$ may be recovered as a liquid, oil or solid, depending upon the particular reactants and conditions chosen. It may be recovered from the reaction in high yields, typically approaching theoretical yields. The reaction may give product of high purity, which may be further purified, if desired by distillation, recrystallization from an organic solvent such as toluene cyclohexane, etc.

Illustrative products which may be prepared in accordance with this invention include:

diphenylantimony acetate
diphenylantimony propionate
diphenylantimony butyrate
ditolylantimony α-methylpropionate
dixylylantimony α-methylpropionate
di-α-naphthylantimony acetate
ditolylantimony butyrate
bis(p-chlorophenyl) antimony γ-chlorobutyrate
diphenylantimony β-ethoxypropionate
diethylantimony acetate
di-n-propylantimony propionate
di-n-butylantimony α-methylpropionate
di-n-octylantimony propionate
dilaurylantimony butyrate
bis(2-ethylhexyl) antimony α-methylpropionate
di-n-hexylantimony acetate
diallylantimony acetate
di-2-butenylantimony propionate
dibenzylantimony α-methylpropionate
dicyclohexylantimony acetate
diphenylantimony butyrate
diphenylantimony valerate
diphenylantimony caproate
ditolylantimony α-methylvalerate
dixylylantimony β-methylvalerate
diethylantimony α-ethylcaproate
di-n-propylantimony caprylate
di-α-naphthylantimony pelargonate
di-n-butylantimony caprate
di-n-octylantimony laurate
dilaurylantimony stearate
di-2-ethylhexylantimony oleate
di-n-hexylantimony benzoate
diallylantimony p-toluate
di-2-butenylantimony p-ethylbenzoate
dibenzylantimony α-naphthoate
dicyclohexylantimony phenylacetate
diphenylantimony phenoxyacetate
diphenylantimony linoleate
ditolylantimony cyclohexanoate
diphenylantimony tetrachlorobenzoate
ditolylantimony p-vinylbenzoate
diphenylantimony tallate
ditolylantimony rosinate
bis-(p-chlorophenyl) antimony pelargonate
diphenylantimony p-chlorobenzoate
diphenylantimony methacrylate The products prepared by the process of this invention have a high degree of biological activity and may be used as bactericides, fungicides, etc. For example, diphenylantimony butyrate may control the growth of such organisms as *Staphylococcus aureus, Aerobacter aerogenes, Candida albicans*, etc., on a wide variety of substrates.

The following examples illustrate practice of this novel invention according to certain of its embodiments.

EXAMPLE 1.—*Diphenylantimony acetate* $\phi_2SbOOCCH_3$ $\phi_2SbCl + NaOOCCH_3 \rightarrow \phi_2SbOOCCH_3 + NaCl$ 233.4 grams (0.75 mole) of diphenylantimony chloride was dissolved in one liter of methanol in a 2-liter beaker and 102 grams (0.75 mole) of sodium acetate trihydrate was added thereto. The resulting slurry was placed on a steam bath and heated for six hours. The slurry was filtered hot to remove precipitated sodium chloride (42.5 grams, 98%). The filtrate was cooled whereupon a first crop of diphenyl-antimony acetate (138 grams, melting point 130–132° C.) was obtained and filtered off. A second crop (112 grams) was obtained by evaporation of the solvent from the filtrate. The combined crops represented a yield of 99.5% of theory. The product was recrystallized from toluene and analyzed.

Calcd. for $C_{14}H_{13}O_2Sb$: Sb, 36.35%; Acid No. 167.5. Found: Sb, 36.92%; Acid No. 163.

EXAMPLE 2.—*Diphenylantimony p-chlorobenzoate* $\phi_2SbOOCC_6H_4Cl$ $\phi_2SbCl + NaOOCC_6H_4Cl \rightarrow \phi_2SbOOCC_6H_4Cl + NaCl$ A mixture of 15.6 grams (0.05 mole) of diphenylantimony chloride, 8.9 grams (0.05 mole) of sodium p-chlorobenzoate, and 250 ml. of water was refluxed with stirring for 30 minutes, after which 50 ml. of methanol was added and refluxing continued for an additional four hours. At the end of this time, the resultant slurry was filtered to recover the product, which had precipitated during the reaction. The yield after drying, was 21.5 grams (100% of theory). The product, as further purified by recrystallization from cyclohexane and isopropyl alcohol, had a melting point of 124–126° C. Analysis showed:

Calcd. for $C_{19}H_{14}O_2ClSb$: Sb, 28.22%; Cl, 8.22%. Found: Sb, 28.10%; Cl, 8.35%.

EXAMPLE 3.—Di-n-octylantimony 2-ethylhexanoate
$(C_8H_{17})_2SbOOCC_7H_{15}$

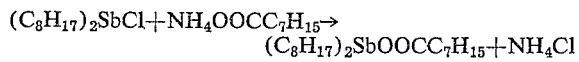

A mixture of 38.4 grams (0.1 mole) of di-n-octyl-antimony chloride, 16.1 grams (0.1 mole) of ammonium 2-ethyl-hexanoate and 500 ml. benzene may be heated to reflux and refluxed with stirring for 5 hours. At the end of this time, the ammonium chloride which precipitates during the reaction may be removed by filtration, and product di-n-octylantimony-2-ethylhexanoate may be recovered in high yield from the filtrate by stripping off benzene under reduced pressure.

As may be seen from these illustrative examples, practice of this invention provides a highly convenient technique which permits attainment of high yields of the desired products.

The novel compounds of this invention having the formula $R_2SbOOCR'$ wherein R is selected from the group consisting of alkyl, aryl, and alkenyl; and R' is selected from the group consisting of alkyl containing at least three carbon atoms, aryl, and alkenyl, are preferred compounds which may be characterized by their superior and unexpected properties. For example, in comparison to compounds wherein R' is e.g. methyl, the preferred compounds may be characterized by higher resistance to hydrolysis, lower tendency to decompose and form objectionable by-products, lower odor and greater ease of handling, much greater oil solubility.

The compounds wherein R' is aryl possess superior stability and could not be prepared by any prior art technique. The compounds wherein R' is alkenyl are unique in that they may contain a reactive unsaturated linkage which may be advantageously employed e.g., in a polymerization reaction. It is a novel feature of this invention that the compounds wherein R' is alkenyl may be prepared without destroying the unsaturated linkage in the alkenyl moiety. The compounds wherein R' is alkyl containing at least 3 carbon atoms are especially useful because of their superior compatibility with organic materials such as cutting oils, polyvinyl chloride and other plastics, detergents, etc.

In order to point up the superiority of the novel preferred compounds of this invention having the formula $R_2SbOOCR'$ wherein R is selected from the group consisting of alkyl, aryl, and alkenyl and R' is selected from the group consisting of alkyl containing at least 3 carbon atoms, aryl and alkenyl, the following comparative tests were run.

Sulfate-reducer test

The objective of this test is to evaluate the potency of a bactericide as a biological control agent in secondary oil recovery.

In accordance with this test, a brine medium and a culture medium are prepared as follows:

Brine medium:

| | |
|---|---|
| NaCl _____grams__ | 30 |
| $MgCl_2 \cdot 6H_2O$ _____do____ | 3.7 |
| $CaCl_2$ _____do____ | 2.5 |
| $MgSO_4 \cdot 7H_2O$ _____do____ | 1.7 |
| $NaHCO_3$ _____do____ | 0.006 |
| Distilled water _____ml__ | 1,000 | pH adjusted to 7.2 with hydrochloric acid.

Culture medium:

| | |
|---|---|
| Calcium lactate _____grams__ | 3.5 |
| Yeast extract _____do____ | 1.0 |
| $MgSO_4 \cdot 7H_2O$ _____do____ | 0.2 |
| NaCl _____do____ | 10.0 |
| $Fe(NH_4)_2(SO_4)_2 \cdot 6H_2O$ _____do____ | 0.1 |
| $FeSO_4$ _____do____ | 0.1 |
| Ascorbic acid _____do____ | 0.1 |
| Distilled water _____ml__ | 1,000 | pH adjusted to 8.4 with sodium hydroxide.

Each medium is thoroughly mixed, purged with nitrogen and placed in separate 30 ml. serum bottles at the rate of 29 ml. per bottle of culture medium and 29.4 ml. per bottle of brine medium. The bottles are purged with nitrogen, sealed and autoclaved for 20 minutes at 121° C.

A 3-day old culture of *Desulfovibrio desulfuricans* mid-continent Strain A is used as the test organism. The bactericide to be evaluated is dissolved in acetone and added to the brine solution to give solutions of 10, 20, 30, 40, 50, and 100 parts per million (p.p.m.). A control, containing no bactericide is also prepared.

Each brine medium is inoculated with 0.3 ml. of the 3-day old organism culture and, immediately thereafter a 1 ml. sample is removed and added to a bottle of culture medium. A 1 ml. sample from the so-inoculated culture medium is added to a second bottle of culture medium and this process is repeated 3 more times, giving a final dilution of 1:24,300,000.

The brine samples are agitated for one hour at 25° C. and the same sampling and dilution procedure is again followed. Thus, at the conclusion of this portion of the test, there will be a set of bottles of culture medium representing the initial organism count and a second set representing the count after one hour.

The culture medium bottles are incubated at 35° C.–37° C. until the first control bottle turns black and for an additional 30 days thereafter. Bacterial counts are made on each of the culture media. A bactericide is considered effective at a particular concentration if the medium does not blacken and if the count after incubation is less than the count of the control after 1 hour.

When the diorganoantimony carboxylates were employed in this test, the following results were obtained.

| Compound: | Effective level (p.p.m.) |
|---|---|
| Diphenylantimony acetate | 100 |
| Diphenylantimony butyrate | 20 |
| Diphenylantimony 2-ethylhexanoate | 30 |
| Diphenylantimony p-chlorobenzoate | 40 |

As may be seen from this test, the novel compounds of this invention may be 2.5–5 times more active than diphenylantimony acetate against sulfate-reducing bacteria.

Soap germicide test

The objective of this test is to determine the compatibility of bactericide with surfactants.

In accordance with this test, culture media are made up as follows.

Neutral soap medium:

| | |
|---|---|
| Sodium stearate (sold under the trademark Ivory) _____grams__ | 1 |
| Nutrient broth _____do____ | 8 |
| Agar _____do____ | 15 |
| Distilled water _____ml__ | 1000 |

Anionic synthetic detergent medium:

| | |
|---|---|
| 30% solution of sodium dodecylbenzene sulfonate (sold under the trademark Santomerse S) _____grams__ | 0.25 |
| Nutrient broth _____do____ | 8 |
| Agar _____do____ | 15 |
| Distilled water _____ml__ | 1000 |

Solutions in acetone of the compound to be tested are added to each of the media while molten at 45° C. to give concentrations of 5, 10, 50, 100 and 500 p.p.m. of compound in the medium. The resultant media are shaken well and poured into sterile Petri dishes.

The media are then inoculated with *Escherichia coli*, a gram-negative bacterium, and incubated for 3 days at 37° C. The incubated dishes are examined visually for bacterial growth and the lowest concentration of bactericide (in p.p.m.) which completely inhibits visual growth is recorded as the effective level.

When the diorganoantimony carboxylate compounds were employed in this test, the following results were obtained.

*Neutral soap medium*

| Compound: | Effective level (p.p.m.) |
|---|---|
| Diphenylantimony acetate | 50 |
| Diphenylantimony butyrate | 5 |
| Diphenylantimony 2-ethylhexanoate | 5 |
| Diphenylantimony p-chlorobenzoate | 5 |

*Anionic synthetic detergent medium*

| Compound: | Effective level (p.p.m.) |
|---|---|
| Diphenylantimony acetate | 50 |
| Diphenylantimony butyrate | 5 |
| Diphenylantimony 2-ethylhexanoate | 5 |
| Diphenylantimony p-chlorobenzoate | 5 |

As may be seen from the test, the preferred novel compounds of this invention may be as much as 10 times as effective as diphenylantimony acetate in combination with detergents.

This application is a continuation-in-part of our co-pending U.S. patent application entitled Process and Product, Ser. No. 241,023, filed Nov. 29, 1962.

Although this invention has been illustrated by reference to specific examples, numerous changes and modifications thereof which clearly fall within the scope of the invention will be apparent to those skilled in the art.

What is claimed is:

1. The process for preparing a diorganoantimony compound of the formula $R_2SbOOCR'$ wherein R is selected from the group consisting of alkyl, aryl, and alkenyl, and R' is hydrocarbon, which comprises mixing together as reactants $R_2SbX$ wherein X is halogen having an atomic weight greater than 19; and $M(OOCR')_a$ wherein M is a cation selected from the group consisting of ammonium, alkali metals and alkaline earth metals, and $a$ is the valence of M; in the presence of an inert solvent for at least one of said reactants, thereby forming product $$R_2SbOOCR'$$

and recovering said product.

2. The process of claim 1 wherein R is aryl.
3. The process of claim 1 wherein R is phenyl.
4. The process of claim 1 wherein R' is selected from the group consisting of alkyl containing at least 3 carbon atoms, aryl, and alkenyl.
5. The process of claim 1 wherein X is chlorine.
6. The process of claim 1 wherein said inert solvent has a boiling point of 60–150° C.
7. The process of claim 1 wherein said inert solvent is water.
8. The process for preparing a diorganoantimony compound of the formula $R_2SbOOCR'$ wherein R is aryl and R' is hydrocarbon which comprises mixing together as reactants $R_2SbCl$ and $M(OOCR')_a$ wherein M is a cation selected from the group consisting of ammonium, alkali metals and alkaline earth metals, and $a$ is the valence of M; in the presence of an inert solvent for at least one of said reactants which solvent has a boiling point of 60–150° C., thereby forming a reaction mixture; maintaining said reaction mixture at a temperature of 20–150° C., thereby forming product $R_2SbOOCR'$; and recovering said product.
9. The process of claim 8 wherein said reactants are mixed together in a ratio of $a$ moles of $R_2SbCl$ per mole of $M(OOCR')_a$.
10. The process of claim 8 wherein R is phenyl.
11. The process of claim 8 wherein R' is selected from the group consisting of alkyl containing at least 3 carbon atoms, aryl, and alkenyl.
12. The process of claim 8 wherein M is sodium.
13. The process of claim 8 wherein M is potassium.
14. The process of claim 8 wherein M is ammonium.
15. The process of claim 8 wherein said inert solvent is water.
16. A novel compound of the formula $R_2SbOOCR'$ wherein R is selected from the group consisting of alkyl, aryl, and alkenyl; and R' is selected from the group consisting of alkyl containing at least three carbon atoms, and aryl.
17. A novel compound as claimed in claim 16 wherein R is aryl and R' is alkyl containing at least three carbon atoms.
18. A novel compound as claimed in claim 16 wherein R is aryl and R' is aryl.
19. Diphenylantimony butyrate.
20. Diphenylantimony valerate.
21. Diphenylantimony caproate.
22. Diphenylantimony linoleate.
23. Diphenylantimony tallate.
24. Diphenylantimony p-chlorobenzoate.
25. Diphenylantimony-2-ethylhexanoate.

References Cited

Kosolapoff, Chem. Abstracts, vol. 48 (1954), p. 6392(c).

Kosolapoff, Chem. Abstracts, vol. 55 (1961), p. 1984(f).

TOBIAS E. LEVOW, *Primary Examiner.*

W. F. W. BELLAMY, *Assistant Examiner.*